US011492066B2

(12) United States Patent
Sakohata

(10) Patent No.: US 11,492,066 B2
(45) Date of Patent: Nov. 8, 2022

(54) DISC BRAKE ROTOR FOR HUMAN-POWERED VEHICLE

(71) Applicant: SHIMANO INC., Sakai (JP)

(72) Inventor: Rei Sakohata, Sakai (JP)

(73) Assignee: SHIMANO INC., Sakai (JP)

( * ) Notice: Subject to any disclaimer, the term of this patent is extended or adjusted under 35 U.S.C. 154(b) by 130 days.

(21) Appl. No.: 17/061,627

(22) Filed: Oct. 2, 2020

(65) Prior Publication Data

US 2022/0106008 A1 Apr. 7, 2022

(51) Int. Cl.
| | | |
|---|---|---|
| *F16D 65/12* | (2006.01) | |
| *B62L 1/00* | (2006.01) | |
| *F16D 65/00* | (2006.01) | |
| *F16D 65/84* | (2006.01) | |
| *F16D 55/00* | (2006.01) | |

(52) U.S. Cl.
CPC .......... *B62L 1/005* (2013.01); *F16D 65/0056* (2013.01); *F16D 65/0068* (2013.01); *F16D 65/84* (2013.01); *F16D 2055/0008* (2013.01); *F16D 2055/0016* (2013.01)

(58) Field of Classification Search
CPC .......... B60T 8/329; B60T 13/662–668; F16D 65/123–128

USPC .......................................... 188/18 A, 218 XL
See application file for complete search history.

(56) References Cited

U.S. PATENT DOCUMENTS

| | | | |
|---|---|---|---|
| 2017/0204921 A1* | 7/2017 | Nakakura | F16D 65/128 |
| 2017/0328428 A1* | 11/2017 | Taniguchi | F16D 65/121 |
| 2018/0201340 A1* | 7/2018 | Kiyokawa | G01P 3/44 |
| 2019/0032738 A1* | 1/2019 | Kuwayama | F16D 65/128 |
| 2019/0390726 A1* | 12/2019 | Kuwayama | F16D 65/123 |

* cited by examiner

*Primary Examiner* — Christopher P Schwartz
(74) *Attorney, Agent, or Firm* — Mori & Ward, LLP

(57) ABSTRACT

A disc brake rotor comprises a hub engagement member, an outer member, and a coupling arm. The hub engagement member is configured to engage with a hub assembly. The outer member is provided radially outwardly of the hub engagement member with respect to a rotational axis of the disc brake rotor. The coupling arm extends radially outwardly from the hub engagement member to the outer member. The coupling arm includes a first axial surface provided on a first axial side in an axial direction with respect to the rotational axis and a second axial surface provided on a second axial side reverse to the first axial side in the axial direction. At least one of the first axial surface and the second axial surface is non-parallel to a reference plane perpendicular to the rotational axis as viewed in a radial direction with respect to the rotational axis.

20 Claims, 7 Drawing Sheets

DISC BRAKE ROTOR FOR HUMAN-POWERED VEHICLE

BACKGROUND OF THE INVENTION

Field of the Invention

The present invention relates to a disc brake rotor for a human-powered vehicle.

Discussion of the Background

A human-powered vehicle includes a disc brake system.

SUMMARY OF THE INVENTION

In accordance with a first aspect of the present invention, a disc brake rotor for a human-powered vehicle comprises a hub engagement member, an outer member, and a coupling arm. The hub engagement member is configured to engage with a hub assembly. The outer member is provided radially outwardly of the hub engagement member with respect to a rotational axis of the disc brake rotor. The coupling arm extends radially outwardly from the hub engagement member to the outer member. The coupling arm includes a first axial surface provided on a first axial side in an axial direction with respect to the rotational axis and a second axial surface provided on a second axial side reverse to the first axial side in the axial direction. At least one of the first axial surface and the second axial surface is non-parallel to a reference plane perpendicular to the rotational axis as viewed in a radial direction with respect to the rotational axis.

With the disc brake rotor according to the first aspect, it is possible to improve a balance between the strength and the weight in the coupling arm.

In accordance with a second aspect of the present invention, a disc brake rotor for a human-powered vehicle comprises a hub engagement member, an outer member, and a coupling arm. The hub engagement member is configured to engage with a hub assembly. The outer member is provided radially outwardly of the hub engagement member with respect to a rotational axis of the disc brake rotor. The coupling arm extends radially outwardly from the hub engagement member to the outer member. The coupling arm includes a radially inner end, a radially outer end, and an intermediate part. The radially inner end defines an inner axial width in an axial direction with respect to the rotational axis. The radially outer end is provided radially outward of the radially inner end. The radially outer end defines an outer axial width in the axial direction. The intermediate part is provided radially between the radially outer end and the radially inner end. The intermediate part defines an intermediate axial width in the axial direction. The intermediate axial width is larger than the inner axial width and the outer axial width.

With the disc brake rotor according to the second aspect, it is possible to improve a balance between the strength and the weight in the coupling arm.

In accordance with a third aspect of the present invention, a disc brake rotor for a human-powered vehicle comprises a hub engagement member, an outer member, and a coupling arm. The hub engagement member is configured to engage with a hub assembly. The outer member is provided radially outwardly of the hub engagement member with respect to a rotational axis of the disc brake rotor. The coupling arm extends radially outwardly from the hub engagement member to the outer member. The coupling arm has a cross section oriented in a radial direction with respect to the rotational axis. The cross section includes a first corner part, a second corner part, a third corner part, and a fourth corner part. The first corner part is provided in a diagonal position of the third corner part. The second corner part is provided in a diagonal position of the fourth corner part. The first diagonal distance is defined between the first corner part and the third corner part. The second diagonal distance is defined between the second corner part and the fourth corner part. The first diagonal distance is different from the second diagonal distance.

With the disc brake rotor according to the third aspect, it is possible to improve a balance between the strength and the weight in the coupling arm.

In accordance with a fourth aspect of the present invention, the disc brake rotor according to the second or third aspect is configured so that the coupling arm includes a first axial surface provided on a first axial side in an axial direction with respect to the rotational axis and a second axial surface provided on a second axial side reverse to the first axial side in the axial direction. At least one of the first axial surface and the second axial surface is non-parallel to a reference plane perpendicular to the rotational axis as viewed in a radial direction with respect to the rotational axis.

With the disc brake rotor according to the fourth aspect, it is possible to effectively improve the balance between the strength and the weight.

In accordance with a fifth aspect of the present invention, the disc brake rotor according to any one of the first to fourth aspects is configured so that the first axial surface is non-parallel to the reference plane so as to define a first axial angle between the first axial surface and the reference plane as viewed in the radial direction. The second axial surface in non-parallel to the reference plane so as to define a second axial angle between the second axial surface and the reference plane as viewed in the radial direction.

With the disc brake rotor according to the fifth aspect, it is possible to effectively improve the balance between the strength and the weight.

In accordance with a sixth aspect of the present invention, the disc brake rotor according to the fifth aspect is configured so that the first axial angle is different from the second axial angle.

With the disc brake rotor according to the sixth aspect, it is possible to more effectively improve the balance between the strength and the weight.

In accordance with a seventh aspect of the present invention, the disc brake rotor according to any one of the first and fourth to sixth aspects is configured so that the hub engagement member includes a first axial end part provided on the first axial side and a second axial end part provided on the second axial side. The first axial surface is closer to the first axial end part than the second axial surface in the axial direction. A first axial distance defined between the first axial surface and the first axial end part in the axial direction is different from a second axial distance defined between the second axial surface and the second axial end part in the axial direction.

With the disc brake rotor according to the seventh aspect, it is possible to effectively improve the balance between the strength and the weight.

In accordance with an eighth aspect of the present invention, the disc brake rotor according to the seventh aspect is configured so that the second axial distance is longer than the first axial distance.

With the disc brake rotor according to the eighth aspect, it is possible to more effectively improve the balance between the strength and the weight.

In accordance with a ninth aspect of the present invention, the disc brake rotor according to any one of the first to eighth aspects is configured so that the coupling arm includes a first circumferential surface provided on a first circumferential side in a circumferential direction with respect to the rotational axis and a second circumferential surface provided on a second circumferential side reverse to the first circumferential side in the circumferential direction. At least one of the first circumferential surface and the second circumferential surface is non-parallel to the axial direction.

With the disc brake rotor according to the ninth aspect, it is possible to effectively improve the balance between the strength and the weight.

In accordance with a tenth aspect of the present invention, the disc brake rotor according to the ninth aspect is configured so that the first circumferential surface is non-parallel to the axial direction so as to define a first circumferential angle between the first circumferential surface and the axial direction as viewed in the radial direction. The second circumferential surface is non-parallel to the axial direction so as to define a second circumferential angle between the second circumferential surface and the axial direction as viewed in the radial direction. The first circumferential angle is different from the second circumferential angle.

With the disc brake rotor according to the tenth aspect, it is possible to more effectively improve the balance between the strength and the weight.

In accordance with an eleventh aspect of the present invention, the disc brake rotor according to the tenth aspect is configured so that the first circumferential surface is provided on an upstream side of the second circumferential surface in a driving rotational direction of the disc brake rotor with respect to the rotational axis. The first circumferential angle is larger than the second circumferential angle.

With the disc brake rotor according to the eleventh aspect, it is possible to more effectively improve the balance between the strength and the weight.

In accordance with a twelfth aspect of the present invention, the disc brake rotor according to the tenth or eleventh aspect is configured so that the first axial surface includes a first circumferential end and a first additional circumferential end provided on a downstream side of the first circumferential end in a driving rotational direction of the disc brake rotor with respect to the rotational axis. The first axial surface extends between the first circumferential end and the first additional circumferential end in the circumferential direction. The second axial surface includes a second circumferential end and a second additional circumferential end provided on a downstream side of the second circumferential end in the driving rotational direction. The second axial surface extends between the second circumferential end and the second additional circumferential end in the circumferential direction. The axial direction includes a first axial direction and a second axial direction opposite to the first axial direction. The first circumferential end is offset from the first additional circumferential end in the first axial direction. The second circumferential end is offset from the second additional circumferential end in the first axial direction of the disc brake rotor.

With the disc brake rotor according to the twelfth aspect, it is possible to more effectively improve the balance between the strength and the weight.

In accordance with a thirteenth aspect of the present invention, the disc brake rotor according to any one of the first and third to twelfth aspects is configured so that the coupling arm includes a radially inner end, a radially outer end, and an intermediate part. The radially outer end is provided radially outward of the radially inner end. The intermediate part is provided radially between the radially outer end and the radially inner end. The intermediate part has a maximum axial width in the coupling arm. The maximum axial width is defined in the axial direction with respect to the rotational axis.

With the disc brake rotor according to the thirteenth aspect, it is possible to effectively improve the balance between the strength and the weight.

In accordance with a fourteenth aspect of the present invention, the disc brake rotor according to the thirteenth aspect is configured so that the radially outer end is provided on a downstream side of the radially inner end in a driving rotational direction of the disc brake rotor with respect to the rotational axis.

With the disc brake rotor according to the fourteenth aspect, it is possible to more effectively improve the balance between the strength and the weight.

In accordance with a fifteenth aspect of the present invention, the disc brake rotor according to the thirteenth or fourteenth aspect is configured so that the coupling arm has a curved shape from the radially inner end to the radially outer end as viewed in the axial direction.

With the disc brake rotor according to the fifteenth aspect, it is possible to more effectively improve the balance between the strength and the weight.

In accordance with a sixteenth aspect of the present invention, the disc brake rotor according to any one of the first, second, and fourth to fifteenth aspects is configured so that the coupling arm has a cross section taken along the circumferential direction. The cross section includes a first corner part, a second corner part, a third corner part, and a fourth corner part. The first corner part is provided in a diagonal position of the third corner part. The second corner part is provided in a diagonal position of the fourth corner part. A first diagonal distance is defined between the first corner part and the third corner part. A second diagonal distance is defined between the second corner part and the fourth corner part. The first diagonal distance is different from the second diagonal distance.

With the disc brake rotor according to the sixteenth aspect, it is possible to effectively improve the balance between the strength and the weight.

In accordance with a seventeenth aspect of the present invention, the disc brake rotor according to the third or sixteenth aspect is configured so that at least one of the first corner part, the second corner part, the third corner part, and the fourth corner part has a round shape.

With the disc brake rotor according to the seventeenth aspect, it is possible to more effectively improve the balance between the strength and the weight.

In accordance with an eighteenth aspect of the present invention, the disc brake rotor according to any one of the third, sixteenth, and seventeenth aspects is configured so that the cross section has a rounded square shape.

With the disc brake rotor according to the eighteenth aspect, it is possible to more effectively improve the balance between the strength and the weight.

In accordance with a nineteenth aspect of the present invention, the disc brake rotor according to any one of the first to eighteenth aspects is configured so that the hub engagement member includes a plurality of internal teeth configured to engage with the hub assembly.

With the disc brake rotor according to the nineteenth aspect, it is possible to effectively improve the balance between the strength and the weight.

In accordance with a twentieth aspect of the present invention, the disc brake rotor according to any one of the first to nineteenth aspects is configured so that the coupling arm is provided between the hub engagement member and the outer member with a prescribed total number. The prescribed total number is at least four.

With the disc brake rotor according to the twentieth aspect, it is possible to effectively improve the balance between the strength and the weight.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
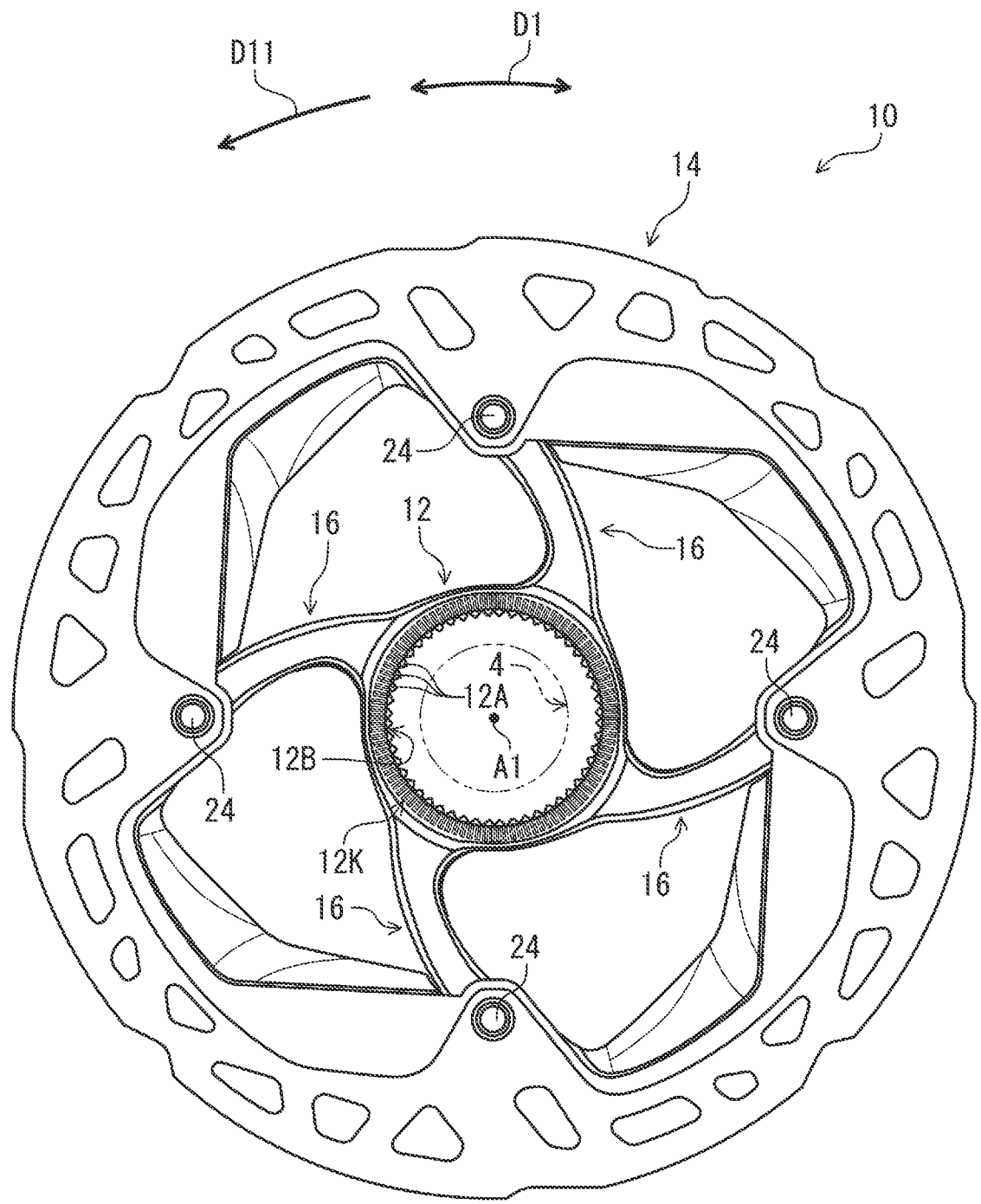
FIG. 1 is a side elevational view of a disc brake rotor in accordance with an embodiment.

The embodiment(s) will now be described with reference to the accompanying drawings, wherein like reference numerals designate corresponding or identical elements throughout the various drawings.

As seen in FIG. 1, a disc brake rotor 10 for a human-powered vehicle comprises a hub engagement member 12, an outer member 14, and a coupling arm 16. The hub engagement member 12 is configured to engage with a hub assembly 4. The outer member 14 is provided radially outwardly of the hub engagement member 12 with respect to a rotational axis A1 of the disc brake rotor 10. The outer member 14 has an annular shape.

The coupling arm 16 extends radially outwardly from the hub engagement member 12 to the outer member 14. The coupling arm 16 is provided between the hub engagement member 12 and the outer member 14 with a prescribed total number. The prescribed total number is at least four. In the present embodiment, the prescribed total number is four. In other words, the disc brake rotor 10 comprises a plurality of coupling arms 16. The plurality of coupling arms 16 includes at least four coupling arms 16. The plurality of coupling arms 16 includes four coupling arms 16. However, the prescribed total number is not limited to four if needed and/or desired. The coupling arms 16 have the same structure as each other. However, at least one of the coupling arms 16 can have a shape different from another of the coupling arms 16 if needed and/or desired.

In the present embodiment, each of the hub engagement member 12, the outer member 14, and the coupling arm 16 is made of a metallic material. However, at least one of the hub engagement member 12, the outer member 14, and the coupling arm 16 can be made of a non-metallic material. In the present embodiment, the coupling arm 16 is made of aluminum or aluminum alloy. However, the coupling arm 16 can be made of a material other than aluminum and aluminum alloy.

For example, the human-powered vehicle is a vehicle to travel with a motive power including at least human power of a user who rides the human-powered vehicle (i.e., rider). The human-powered vehicle has an arbitrary number of wheels. For example, the human-powered vehicle has at least one wheel. In the present disclosure, the human-powered vehicle preferably has a smaller size than that of a four-wheeled automobile. However, the human-powered vehicle can have an arbitrary size. For example, the human-powered vehicle can have a larger size than that of the four-wheeled automobile. Examples of the human-powered vehicle include a bicycle and a kick scooter. In the present disclosure, the human-powered vehicle includes a bicycle. An electric assisting system including an electric motor can be applied to the human-powered vehicle (e.g., the bicycle) to assist muscular motive power of the user. Namely, the human-powered vehicle can be an E-bike.

The disc brake rotor 10 is configured to be coupled to a wheel to rotate along with the wheel. For example, the disc brake rotor 10 is configured to be coupled to the hub assembly 4 of the wheel. The disc brake rotor 10 is rotatable relative to the rotational axis A1 in a driving rotational direction D11 during pedaling. The driving rotational direction D11 is defined along a circumferential direction D1 of the disc brake rotor 10.

The hub engagement member 12 has an annular shape. The hub engagement member 12 includes a plurality of internal teeth 12A configured to engage with the hub assembly 4. The plurality of internal teeth 12A constitutes an inner serration 12B. The hub engagement member 12 includes a knurled part 12K. The knurled part 12K is contactable with a lock member of the hub assembly 4 in a state where the disc brake rotor 10 is mounted on the hub assembly 4. The knurled part 12K includes a plurality of projections circumferential arranged at a constant pitch. However, the structure of the hub engagement member 12 is not limited to this embodiment.

Figure 2:
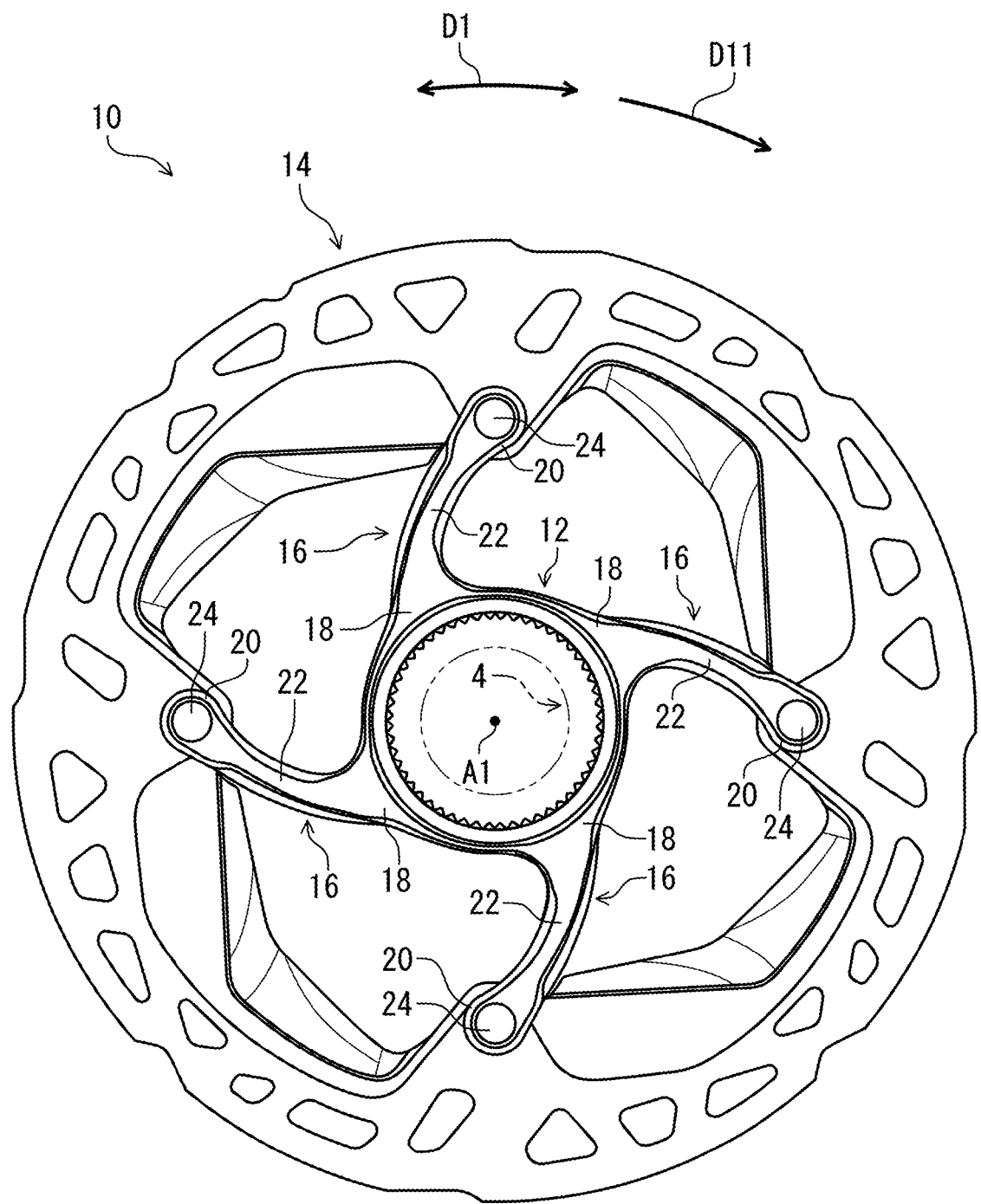
FIG. 2 is another side elevational view of the disc brake rotor illustrated in FIG. 1.

As seen in FIG. 2, the coupling arm 16 includes a radially inner end 18, a radially outer end 20, and an intermediate part 22. The radially outer end 20 is provided radially outward of the radially inner end 18. The intermediate part 22 is provided radially between the radially outer end 20 and the radially inner end 18. The radially outer end 20 is provided on a downstream side of the radially inner end 18 in the driving rotational direction D11 of the disc brake rotor 10 with respect to the rotational axis A1.

The radially outer end 20 is coupled to the outer member 14. The coupling arm 16 is a separate member from the outer member 14. The radially outer end 20 is coupled to the outer member 14 with a fastener such as a rivet 24 via a coupling hole 20A of the outer end 20. The radially inner end 18 is coupled to the hub engagement member 12. The coupling arm 16 is integrally provided with the hub engagement member 12 as a one-piece unitary member. However, the coupling arm 16 can be a separate member from the hub engagement member 12 if needed and/or desired. The coupling arm 16 can be integrally provided with the outer member 14 as a one-piece unitary member if needed and/or desired.

Figure 3:
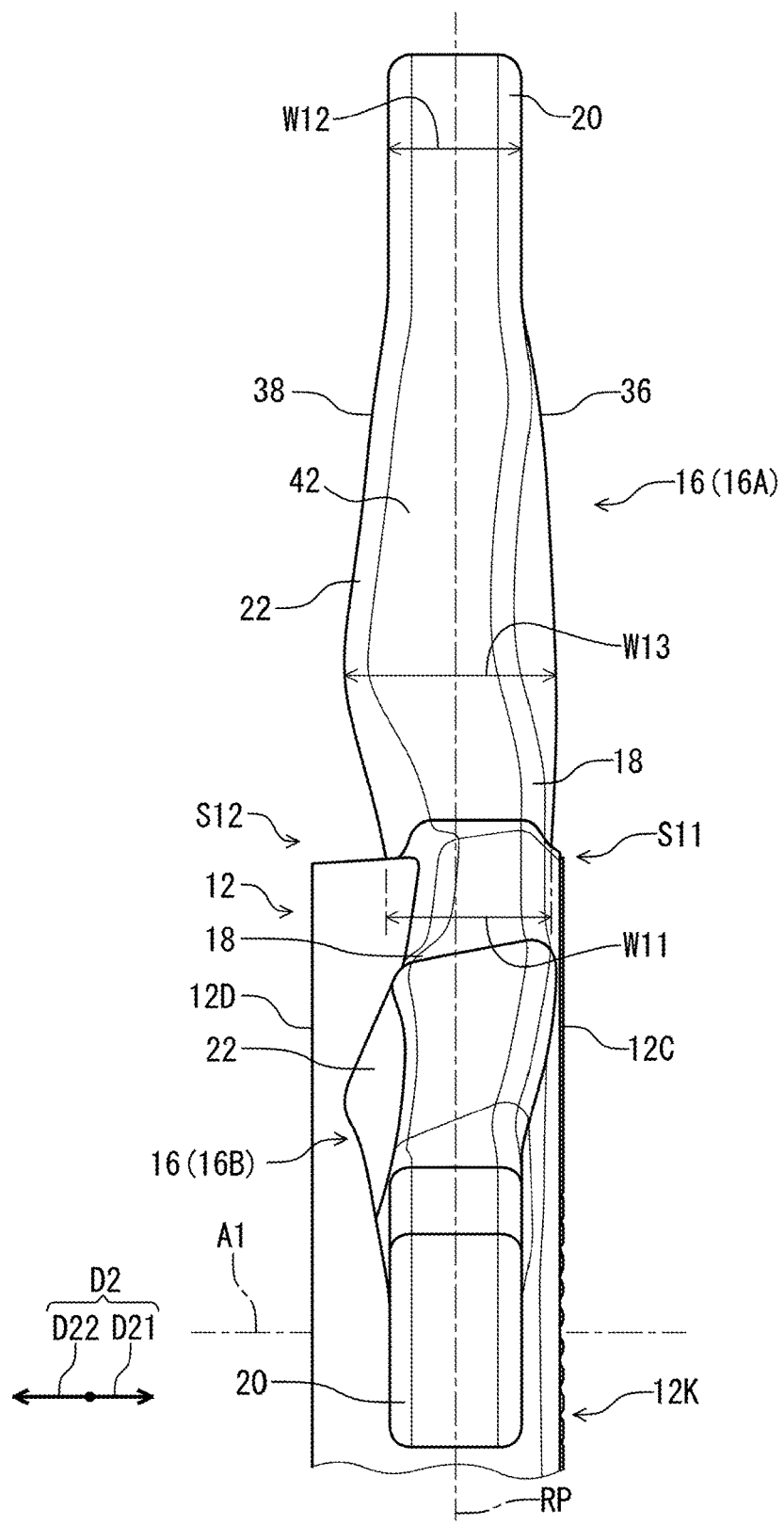
FIG. 3 is a front view of the disc brake rotor illustrated in FIG. 1, with an outer member omitted.

As seen in FIG. 3, the disc brake rotor 10 has a first axial side S11 and a second axial side S12 reverse to the first axial side S11 in an axial direction D2 with respect to the rotational axis A1. The axial direction D2 includes a first axial direction D21 and a second axial direction D22 opposite to the first axial direction D21. The knurled part 12K of the hub engagement member 12 is provided on the first axial side S11. The hub engagement member 12 includes a first axial end part 12C and a second axial end part 12D. The first axial end part 12C is provided on the first axial side S11. The second axial end part 12D is provided on the second axial side S12. The knurled part 12K is provide on the first axial end part 12C.

The coupling arm 16 (e.g., the coupling arm 16A in FIG. 3) has a wavy shape from the radially inner end 18 to the radially outer end 20 along a reference plane RP perpendicular to the rotational axis A1 as viewed in the circumferential direction D1. The radially inner end 18 is offset in the circumferential direction D1 (here, the driving rotational direction D11) with respect to the radially outer end 20 as viewed in a radial direction with respect to the rotational axis A1.

The radially inner end 18 defines an inner axial width W11 in the axial direction D2 with respect to the rotational axis A1. The radially outer end 20 defines an outer axial width W12 in the axial direction D2. The intermediate part 22 defines an intermediate axial width W13 in the axial direction D2. The intermediate axial width W13 is larger than the inner axial width W11 and the outer axial width W12. In the present embodiment, the intermediate axial width W13 is a maximum axial width in the coupling arm 16. Namely, the intermediate part 22 has the maximum axial width W13 in the coupling arm 16. The maximum axial width W13 is defined in the axial direction D2 with respect to the rotational axis A1. However, the maximum axial width can be defined at portions other than the intermediate part 22 if needed and/or desired.

Figure 4:
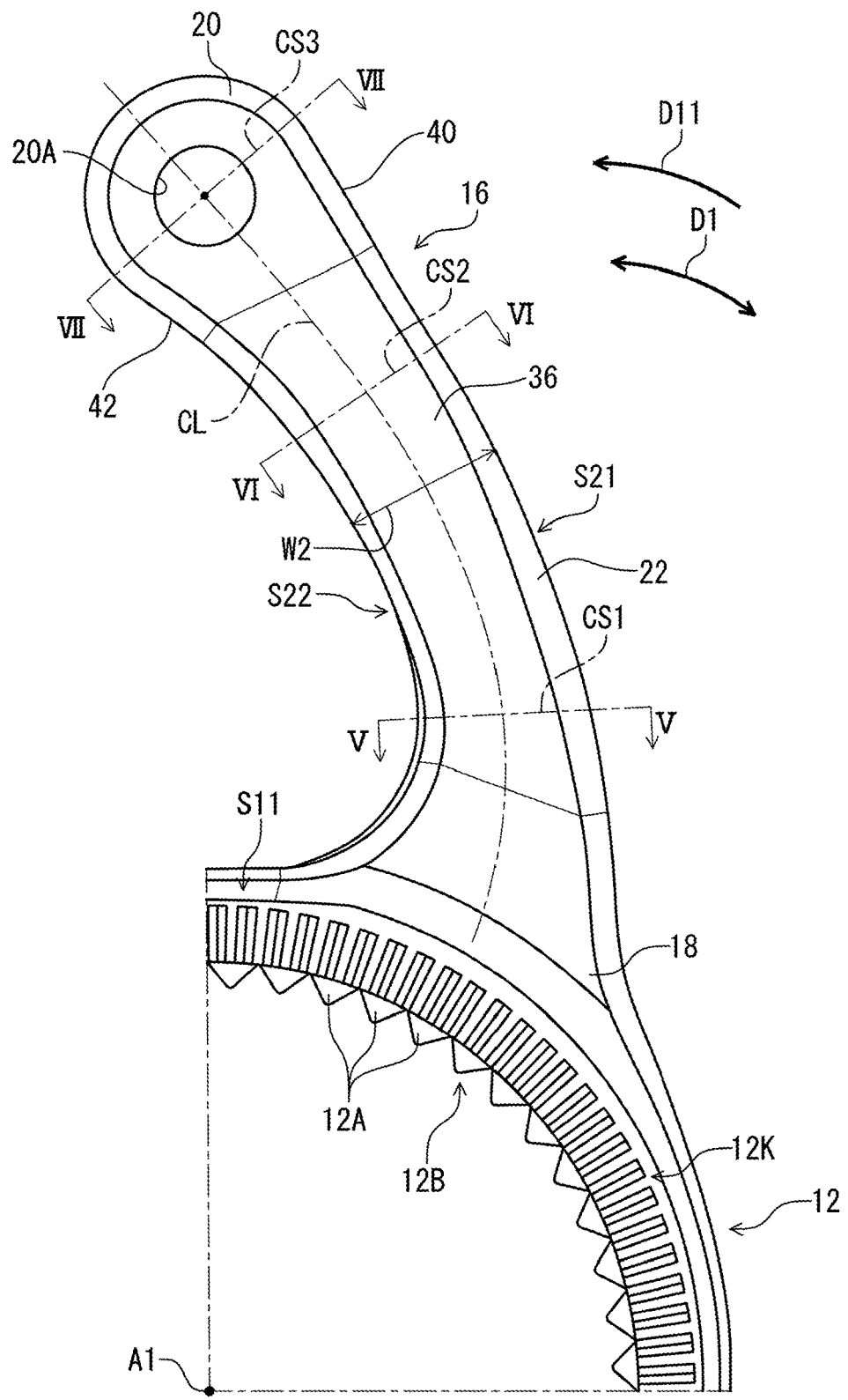
FIG. 4 is a partial side elevational view of the disc brake rotor illustrated in FIG. 1, with an outer member omitted.

As seen in FIG. 4, the coupling arm 16 has a first circumferential side S21 and a second circumferential side S22 reverse to the first circumferential side S21 in the circumferential direction D1. The first circumferential side S21 is provided on an upstream side of the second circumferential side S22 in the driving rotational direction D11.

The coupling arm 16 has a curved shape from the radially inner end 18 to the radially outer end 20 as viewed in the axial direction D2. The coupling arm 16 has a circumferential width W2 defined along the circumferential direction D1 as viewed along the rotational axis A1. The coupling arm 16 has a longitudinal center line CL as viewed along the rotational axis A1. The longitudinal center line CL is defined to bisect the circumferential width W2 of the coupling arm 16 as viewed along the rotational axis A1. The longitudinal center line CL extends from the radially inner end 18 to the radially outer end 20.

Figure 5:
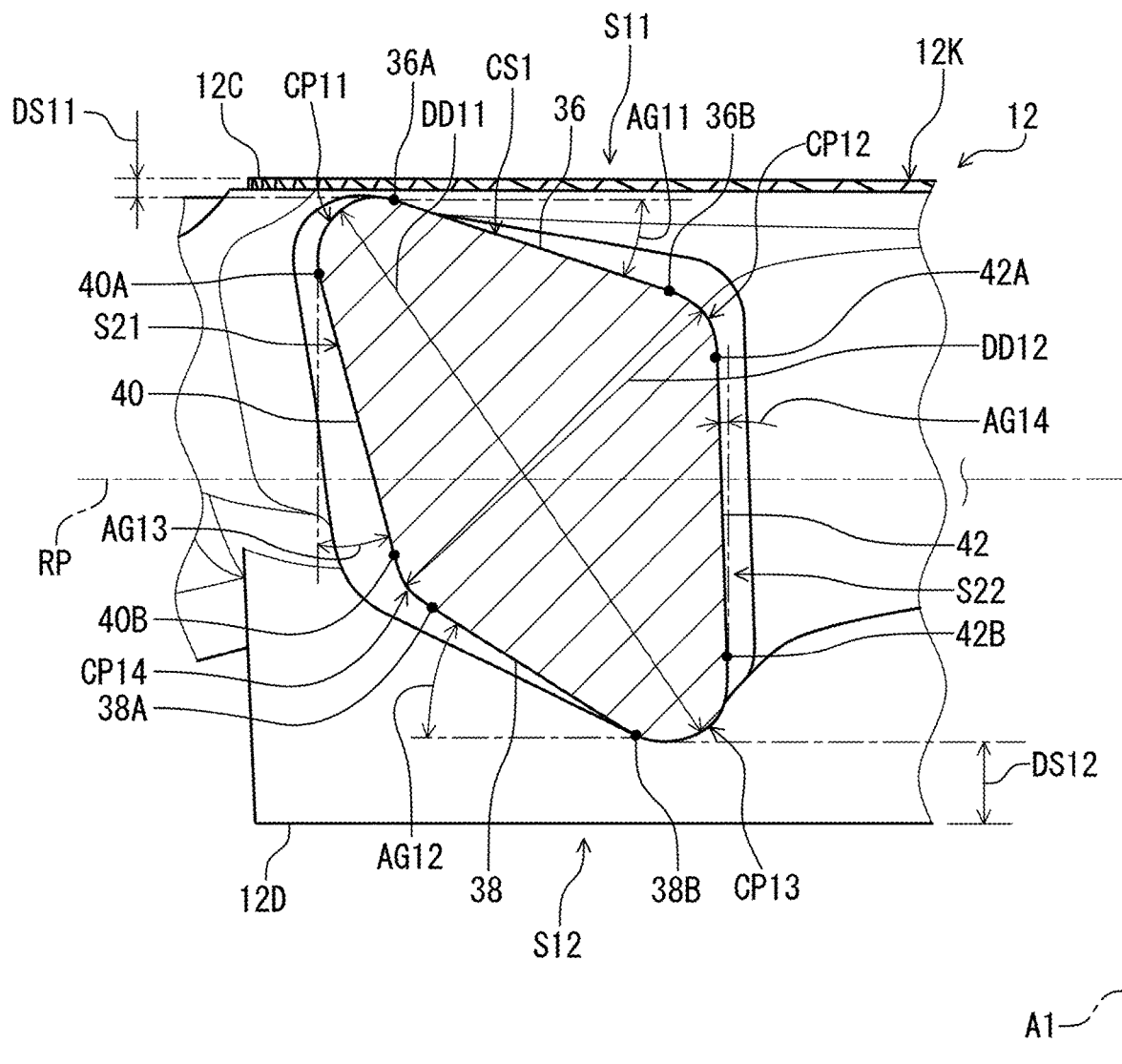
FIG. 5 is a partial cross-sectional view of the disc brake rotor taken along line V-V of FIG. 4.
Figure 6:
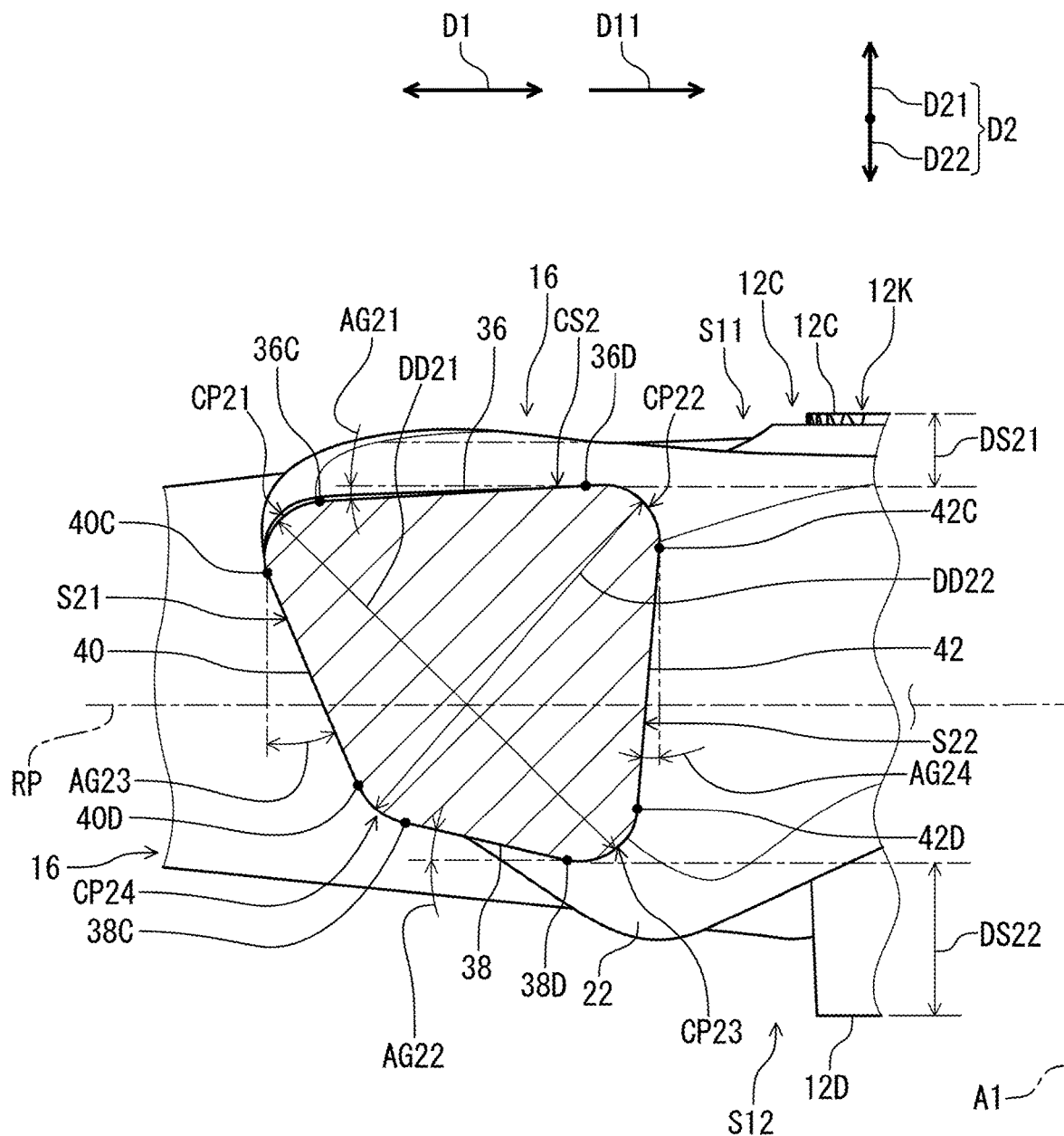
FIG. 6 is a partial cross-sectional view of the disc brake rotor taken along line VI-VI of FIG. 4.
Figure 7:
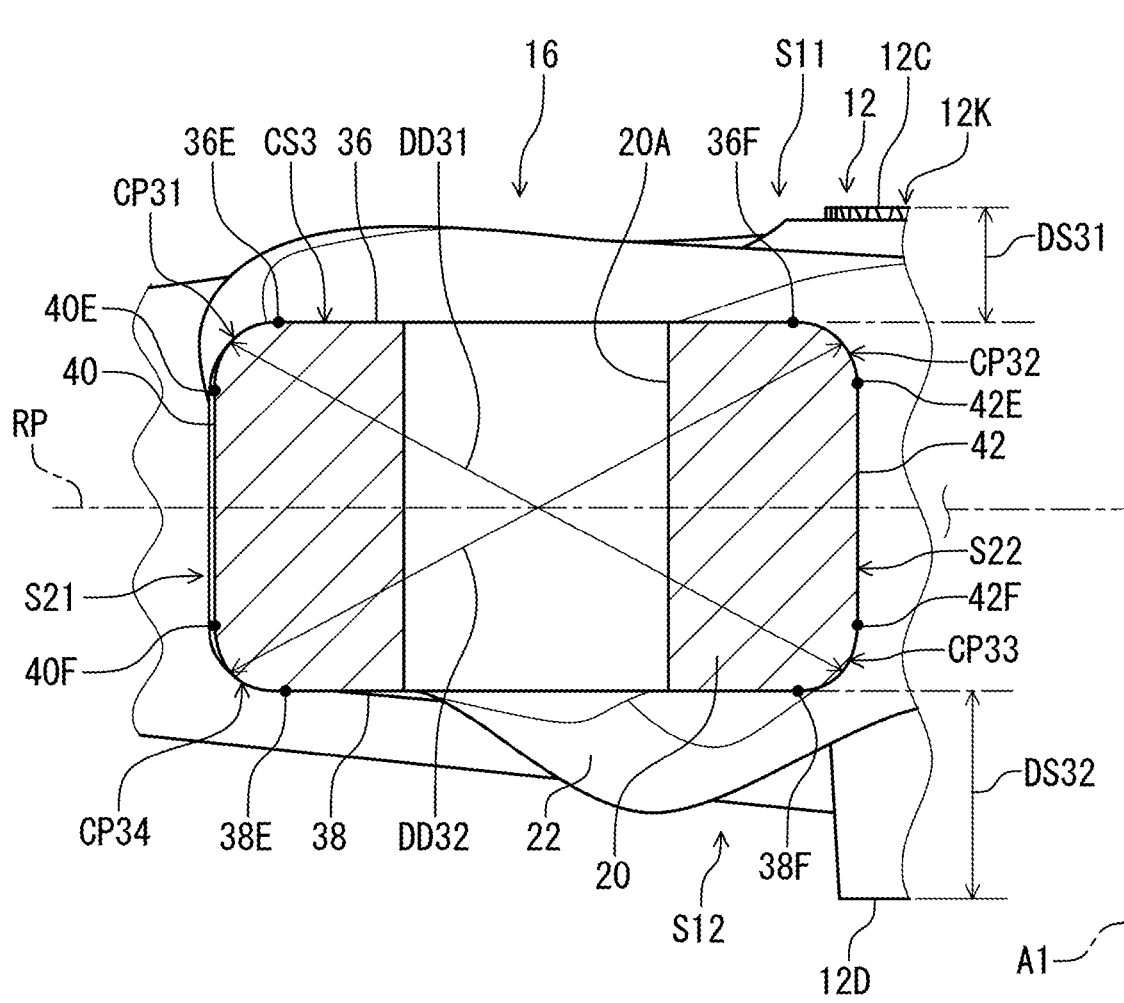
FIG. 7 is a partial cross-sectional view of the disc brake rotor taken along line VII-VII of FIG. 4.

FIGS. 5 to 7 are cross-sectional views taken along lines parallel to the rotational axis A1 such that each of the cross sections shown in FIGS. 5 to 7 have a minimum area in its position.

The coupling arm 16 has a cross section CS1. The cross section CS1 is oriented in a radial direction with respect to the rotational axis A1. The cross section CS1 is taken along the circumferential direction D1. The coupling arm 16 has a cross section CS2. The cross section CS2 is oriented in a radial direction with respect to the rotational axis A1. The cross section CS2 is taken along the circumferential direction D1. The coupling arm 16 has a cross section CS3. The cross section CS3 is oriented in a radial direction with respect to the rotational axis A1. The cross section CS3 is taken along the circumferential direction D1.

As seen in FIG. 5, the coupling arm 16 includes a first axial surface 36 and a second axial surface 38. The first axial surface 36 is provided on the first axial side S11 in the axial direction D2 with respect to the rotational axis A1. The second axial surface 38 is provided on the second axial side S12 reverse to the first axial side S11 in the axial direction D2. The first axial surface 36 is oriented in the first axial direction D21. The second axial surface 38 is oriented in the second axial direction D22. The cross section CS1 of the coupling arm 16 is perpendicular to the reference plane RP. The cross section CS1 of coupling arm 16 is offset in the first axial direction D21 with respect to the hub engagement member 12.

In the cross section CS1, the first axial surface 36 is closer to the first axial end part 12C than the second axial surface 38 in the axial direction D2. In the cross section CS1, a first axial distance DS11 defined between the first axial surface 36 and the first axial end part 12C in the axial direction D2 is different from a second axial distance DS12 defined between the second axial surface 38 and the second axial end part 12D in the axial direction D2. In the present embodiment, the second axial distance DS12 is longer than the first axial distance DS11. However, the second axial distance DS12 can be equal to or shorter than the first axial distance DS11 if needed and/or desired.

In the cross section CS1, at least one of the first axial surface 36 and the second axial surface 38 is non-parallel to the reference plane RP perpendicular to the rotational axis A1 as viewed in the radial direction with respect to the rotational axis A1.

In the present embodiment, in the cross section CS1, the first axial surface 36 and the second axial surface 38 are non-parallel to the reference plane RP as viewed in a radial direction with respect to the rotational axis A1. In the cross section CS1, however, one of the first axial surface 36 and the second axial surface 38 can be parallel to the reference plane RP as viewed in the radial direction with respect to the rotational axis A1 if needed and/or desired. In the cross section CS1, one of the first axial surface 36 and the second axial surface 38 can be parallel to the reference plane RP if needed and/or desired.

In the cross section CS1, the first axial surface 36 is non-parallel to the reference plane RP so as to define a first axial angle AG11 between the first axial surface 36 and the reference plane RP as viewed in the radial direction. In the cross section CS1, the second axial surface 38 in non-parallel to the reference plane RP so as to define a second axial angle AG12 between the second axial surface 38 and the reference plane RP as viewed in the radial direction. The first axial angle AG11 is different from the second axial angle AG12 in the cross section CS1. In the present embodiment, the second axial angle AG12 is larger than the first axial angle AG11. However, the second axial angle AG12 can be equal to or larger than the first axial angle AG11 if needed and/or desired.

The coupling arm 16 includes a first circumferential surface 40 and a second circumferential surface 42. The first circumferential surface 40 is provided on the first circumferential side S21 in the circumferential direction D1 with respect to the rotational axis A1. The second circumferential surface 42 is provided on the second circumferential side S22 reverse to the first circumferential side S21 in the circumferential direction D1. The first circumferential surface 40 is provided on an upstream side of the second circumferential surface 42 in the driving rotational direction D11 of the disc brake rotor 10 with respect to the rotational axis A1. However, the first circumferential surface 40 can be provided on a downstream side of the second circumferential surface 42 in the driving rotational direction D11 if needed and/or desired.

At least one of the first circumferential surface 40 and the second circumferential surface 42 is non-parallel to the axial direction D2 in the cross section CS1. In the present embodiment, the first circumferential surface 40 and the second circumferential surface 42 are non-parallel to the axial direction D2 in the cross section CS1. In the cross section CS1, however, at least one of the first circumferential surface 40 and the second circumferential surface 42 can be parallel to the axial direction D2 if needed and/or desired.

In the cross section CS1, the first circumferential surface 40 is non-parallel to the axial direction D2 so as to define a first circumferential angle AG13 between the first circumferential surface 40 and the axial direction D2 as viewed in the radial direction. In the cross section CS1, the second circumferential surface 42 is non-parallel to the axial direction D2 so as to define a second circumferential angle AG14 between the second circumferential surface 42 and the axial direction D2 as viewed in the radial direction. The first circumferential angle AG13 is different from the second circumferential angle AG14. In the present embodiment, the first circumferential angle AG13 is larger than the second circumferential angle AG14. However, the first circumferential angle AG13 can be equal to or smaller than the second circumferential angle AG14 if needed and/or desired.

In the cross section CS1, the first axial surface 36 includes a first circumferential end 36A and a first additional circumferential end 36B. The first circumferential end 36A and the first additional circumferential end 36B are provided on the cross section CS1. In the cross section CS1, the first additional circumferential end 36B is provided on a downstream side of the first circumferential end 36A in the driving rotational direction D11 of the disc brake rotor 10 with respect to the rotational axis A1. In the cross section CS1, the first axial surface 36 extends between the first circumferential end 36A and the first additional circumferential end 36B in the circumferential direction D1.

In the cross section CS1, the second axial surface 38 includes a second circumferential end 38A and a second additional circumferential end 38B. The second circumferential end 38A and the second additional circumferential end 38B are provided on the cross section CS1. In the cross section CS1, the second additional circumferential end 38B is provided on a downstream side of the second circumferential end 38A in the driving rotational direction D11. In the cross section CS1, the second axial surface 38 extends between the second circumferential end 38A and the second additional circumferential end 38B in the circumferential direction D1.

In the cross section CS1, the first circumferential end 36A is offset from the first additional circumferential end 36B in the first axial direction D21. However, the first circumferential end 36A can be offset from the first additional circumferential end 36B in the second axial direction D22 or the first circumferential end 36A and the first additional circumferential end 36B can be provided in the same position in the axial direction D2 if needed and/or desired. In the cross section CS1, the second circumferential end 38A is offset from the second additional circumferential end 38B in the first axial direction D21 of the disc brake rotor 10. However, the second circumferential end 38A can be offset from the second additional circumferential end 38B in the second axial direction D22 or the second circumferential end 38A and the second additional circumferential end 38B can be provided in the same position in the axial direction D2 if needed and/or desired.

In the cross section CS1, the first circumferential surface 40 includes a first axial end 40A and a first additional axial end 40B. The first axial end 40A and the first additional axial end 40B are provided on the cross section CS1. In the cross section CS1, the first axial end 40A is closer to the first axial end part 12C of the hub engagement member 12 than the first additional axial end 40B in the axial direction D2. In the cross section CS1, the first circumferential surface 40 extends between the first axial end 40A and the first additional axial end 40B in the axial direction D2.

In the cross section CS1, the second circumferential surface 42 includes a second axial end 42A and a second additional axial end 42B. The second axial end 42A and the second additional axial end 42B are provided on the cross section CS1. In the cross section CS1, the second axial end 42A is closer to the first axial end part 12C of the hub engagement member 12 than the second additional axial end 42B in the axial direction D2. In the cross section CS1, the second circumferential surface 42 extends between the second axial end 42A and the second additional axial end 42B in the circumferential direction D1.

In the cross section CS1, the first additional axial end 40B is offset from the first axial end 40A in the driving rotational direction D11. However, the first axial end 40A can be offset from the first additional axial end 40B in the driving rotational direction D11 or the first axial end 40A and the first additional axial end 40B can be provided in the same position in the circumferential direction D1 if needed and/or desired. In the cross section CS1, the second additional axial end 42B is offset from the second axial end 42A in the driving rotational direction D11. However, the second axial end 42A can be offset from the second additional axial end 42B in the driving rotational direction D11 or the second axial end 42A and the second additional axial end 42B can be provided in the same position in the circumferential direction D1 if needed and/or desired.

The cross section CS1 includes a first corner part CP11, a second corner part CP12, a third corner part CP13, and a fourth corner part CP14. The first corner part CP11 is provided in a diagonal position of the third corner part CP13. The second corner part CP12 is provided in a diagonal position of the fourth corner part CP14. A first diagonal distance DD11 is defined between the first corner part CP11 and the third corner part CP13. A second diagonal distance DD12 is defined between the second corner part CP12 and the fourth corner part CP14. The first diagonal distance DD11 is different from the second diagonal distance DD12. In the present embodiment, the first diagonal distance DD11 is longer than the second diagonal distance DD12. However, the first diagonal distance DD11 can be equal to or shorter than the second diagonal distance DD12 if needed and/or desired.

For example, the first corner part CP11 is provided between the first axial surface 36 and the first circumferential surface 40 in the cross section CS1. The second corner part CP12 is provided between the first axial surface 36 and the second circumferential surface 42 in the cross section CS1. The third corner part CP13 is provided between the second axial surface 38 and the second circumferential surface 42 in the cross section CS1. The fourth corner part CP14 is provided between the second axial surface 38 and the first circumferential surface 40 in the cross section CS1.

The first corner part CP11 is provided between the first circumferential end 36A of the first axial surface 36 and the first axial end 40A of the first circumferential surface 40 in the cross section CS1. The second corner part CP12 is provided between the first additional circumferential end 36B of the first axial surface 36 and the second axial end 42A of the second circumferential surface 42 in the cross section CS1. The third corner part CP13 is provided between the second additional circumferential end 38B of the second axial surface 38 and the second additional axial end 42B of the second circumferential surface 42 in the cross section CS1. The fourth corner part CP14 is provided between the second circumferential end 38A of the second axial surface 38 and the first additional axial end 40B of the first circumferential surface 40 in the cross section CS1.

At least one of the first corner part CP11, the second corner part CP12, the third corner part CP13, and the fourth corner part CP14 has a round shape. In the present embodiment, each of the first corner part CP11, the second corner part CP12, the third corner part CP13, and the fourth corner part CP14 has a round shape. The cross section has a rounded square shape. However, the shape of the cross section is not limited to the rounded square shape. At least one of the first corner part CP11, the second corner part CP12, the third corner part CP13, and the fourth corner part CP14 can have a shape other than a round shape if needed and/or desired.

As seen in FIG. 6, the cross section CS2 of the coupling arm 16 is perpendicular to the reference plane RP. The cross section CS2 of coupling arm 16 is offset in the first axial direction D21 with respect to the hub engagement member 12.

In the cross section CS2, the first axial surface 36 is closer to the first axial end part 12C than the second axial surface 38 in the axial direction D2. In the cross section CS2, a first axial distance DS21 defined between the first axial surface 36 and the first axial end part 12C in the axial direction D2 is different from a second axial distance DS22 defined between the second axial surface 38 and the second axial end part 12D in the axial direction D2, in the cross section CS2. In the present embodiment, the second axial distance DS22 is longer than the first axial distance DS21. However, the second axial distance DS22 can be equal to or shorter than the first axial distance DS21 if needed and/or desired.

In the cross section CS2, at least one of the first axial surface 36 and the second axial surface 38 is non-parallel to the reference plane RP perpendicular to the rotational axis A1 as viewed in the radial direction with respect to the rotational axis A1.

In the present embodiment, In the cross section CS2, the first axial surface 36 and the second axial surface 38 are non-parallel to the reference plane RP as viewed in a radial direction with respect to the rotational axis A1. In the cross section CS2, however, one of the first axial surface 36 and the second axial surface 38 can be parallel to the reference plane RP as viewed in the radial direction with respect to the rotational axis A1 if needed and/or desired. One of the first axial surface 36 and the second axial surface 38 can be parallel to the reference plane RP in the cross section CS2 if needed and/or desired.

In the cross section CS2, the first axial surface 36 is non-parallel to the reference plane RP so as to define a first axial angle AG21 between the first axial surface 36 and the reference plane RP as viewed in the radial direction. In the cross section CS2, the second axial surface 38 in non-parallel to the reference plane RP so as to define a second axial angle AG22 between the second axial surface 38 and the reference plane RP as viewed in the radial direction. The first axial angle AG21 is different from the second axial angle AG22. In the present embodiment, the second axial angle AG22 is larger than the first axial angle AG21. However, the second axial angle AG22 can be equal to or larger than the first axial angle AG21 if needed and/or desired.

At least one of the first circumferential surface 40 and the second circumferential surface 42 is non-parallel to the axial direction D2 in the cross section CS2. In the present embodiment, the first circumferential surface 40 and the second circumferential surface 42 are non-parallel to the axial direction D2 in the cross section CS2. In the cross section CS2, however, at least one of the first circumferential surface 40 and the second circumferential surface 42 can be parallel to the axial direction D2 if needed and/or desired.

In the cross section CS2, the first circumferential surface 40 is non-parallel to the axial direction D2 so as to define a first circumferential angle AG23 between the first circumferential surface 40 and the axial direction D2 as viewed in the radial direction. In the cross section CS2, the second circumferential surface 42 is non-parallel to the axial direction D2 so as to define a second circumferential angle AG24 between the second circumferential surface 42 and the axial direction D2. The first circumferential angle AG23 is different from the second circumferential angle AG24. In the present embodiment, the first circumferential angle AG23 is larger than the second circumferential angle AG24. However, the first circumferential angle AG23 can be equal to or smaller than the second circumferential angle AG24 if needed and/or desired.

In the cross section CS2, the first axial surface 36 includes a first circumferential end 36C and a first additional circumferential end 36D. The first circumferential end 36C and the first additional circumferential end 36D are provided on the cross section CS2. In the cross section CS2, the first additional circumferential end 36D is provided on a downstream side of the first circumferential end 36C in the driving rotational direction D11 of the disc brake rotor 10 with respect to the rotational axis A1. In the cross section CS2, the first axial surface 36 extends between the first circumferential end 36C and the first additional circumferential end 36D in the circumferential direction D1.

In the cross section CS2, the second axial surface 38 includes a second circumferential end 38C and a second additional circumferential end 38D. The second circumferential end 38C and the second additional circumferential end 38D are provided on the cross section CS2. In the cross section CS2, the second additional circumferential end 38D is provided on a downstream side of the second circumferential end 38C in the driving rotational direction D11. In the cross section CS2, the second axial surface 38 extends between the second circumferential end 38C and the second additional circumferential end 38D in the circumferential direction D1.

In the cross section CS2, the first additional circumferential end 36D is offset from the first circumferential end 36C in the first axial direction D21. However, the first additional circumferential end 36D can be offset from the first circumferential end 36C in the second axial direction D22 or the first circumferential end 36C and the first additional circumferential end 36D can be provided in the same position in the axial direction D2 if needed and/or desired. In the cross section CS2, the second circumferential end 38C is offset from the second additional circumferential end 38D in the first axial direction D21 of the disc brake rotor 10. However, the second circumferential end 38C can be offset from the second additional circumferential end 38D in the second axial direction D22 or the second circumferential end 38C and the second additional circumferential end 38D can be provided in the same position in the axial direction D2 if needed and/or desired.

In the cross section CS2, the first circumferential surface 40 includes a first axial end 40C and a first additional axial end 40D. The first axial end 40C and the first additional axial end 40D are provided on the cross section CS2. In the cross section CS2, the first axial end 40C is closer to the first axial end part 12C of the hub engagement member 12 than the first additional axial end 40D in the axial direction D2. In the cross section CS2, the first circumferential surface 40 extends between the first axial end 40C and the first additional axial end 40D in the axial direction D2.

In the cross section CS2, the second circumferential surface 42 includes a second axial end 42C and a second additional axial end 42D. The second axial end 42C and the second additional axial end 42D are provided on the cross section CS2. In the cross section CS2, the second axial end 42C is closer to the first axial end part 12C of the hub engagement member 12 than the second additional axial end 42D in the axial direction D2. In the cross section CS2, the second circumferential surface 42 extends between the second axial end 42C and the second additional axial end 42D in the circumferential direction D1.

In the cross section CS2, the first additional axial end 40D is offset from the first axial end 40C in the driving rotational direction D11. However, the first axial end 40C can be offset from the first additional axial end 40D in the driving rotational direction D11 or the first axial end 40C and the first additional axial end 40D can be provided in the same position in the circumferential direction D1 if needed and/or desired. In the cross section CS2, the second axial end 42C is offset from the second additional axial end 42D in the driving rotational direction D11. However, the second additional axial end 42D can be offset from the second axial end 42C in the driving rotational direction D11 or the second axial end 42C and the second additional axial end 42D can be provided in the same position in the circumferential direction D1 if needed and/or desired.

The cross section CS2 includes a first corner part CP21, a second corner part CP22, a third corner part CP23, and a fourth corner part CP24. The first corner part CP21 is provided in a diagonal position of the third corner part CP23. The second corner part CP22 is provided in a diagonal position of the fourth corner part CP24. A first diagonal distance DD21 is defined between the first corner part CP21 and the third corner part CP23. A second diagonal distance DD22 is defined between the second corner part CP22 and the fourth corner part CP24. The first diagonal distance DD21 is different from the second diagonal distance DD22. In the present embodiment, the first diagonal distance DD21 is longer than the second diagonal distance DD22. However, the first diagonal distance DD21 can be equal to or shorter than the second diagonal distance DD22 if needed and/or desired.

For example, the first corner part CP21 is provided between the first axial surface 36 and the first circumferential surface 40 in the cross section CS2. The second corner part CP22 is provided between the first axial surface 36 and the second circumferential surface 42 in the cross section CS2. The third corner part CP23 is provided between the second axial surface 38 and the second circumferential surface 42 in the cross section CS2. The fourth corner part CP24 is provided between the second axial surface 38 and the first circumferential surface 40 in the cross section CS2.

The first corner part CP21 is provided between the first circumferential end 36C of the first axial surface 36 and the first axial end 40C of the first circumferential surface 40 in the cross section CS2. The second corner part CP22 is provided between the first additional circumferential end 36D of the first axial surface 36 and the second axial end 42C of the second circumferential surface 42 in the cross section CS2. The third corner part CP23 is provided between the second additional circumferential end 38D of the second axial surface 38 and the second additional axial end 42D of the second circumferential surface 42 in the cross section CS2. The fourth corner part CP24 is provided between the second circumferential end 38C of the second axial surface 38 and the first additional axial end 40D of the first circumferential surface 40 in the cross section CS2.

At least one of the first corner part CP21, the second corner part CP22, the third corner part CP23, and the fourth corner part CP24 has a round shape. In the present embodiment, each of the first corner part CP21, the second corner part CP22, the third corner part CP23, and the fourth corner part CP24 has a round shape. The cross section has a rounded square shape. However, the shape of the cross section is not limited to the rounded square shape. At least one of the first corner part CP21, the second corner part CP22, the third corner part CP23, and the fourth corner part CP24 can have a shape other than a round shape if needed and/or desired.

As seen in FIG. 7, the cross section CS3 of the coupling arm 16 is perpendicular to the reference plane RP. The cross section CS3 of coupling arm 16 is offset in the first axial direction D21 with respect to the hub engagement member 12.

In the cross section CS3, the first axial surface 36 is closer to the first axial end part 12C than the second axial surface 38 in the axial direction D2. In the cross section CS3, a first axial distance DS31 defined between the first axial surface 36 and the first axial end part 12C in the axial direction D2 is different from a second axial distance DS32 defined between the second axial surface 38 and the second axial end part 12D in the axial direction D2. In the present embodiment, the second axial distance DS32 is longer than the first axial distance DS31. However, the second axial distance DS32 can be equal to or shorter than the first axial distance DS31 if needed and/or desired.

In the cross section CS3, at least one of the first axial surface 36 and the second axial surface 38 is parallel to the reference plane RP as viewed in the radial direction with respect to the rotational axis A1. In the present embodiment, in the cross section CS3, the first axial surface 36 and the second axial surface 38 are parallel to the reference plane RP as viewed in the radial direction with respect to the rotational axis A1. In the cross section CS3, however, at least one of the first axial surface 36 and the second axial surface 38 can be non-parallel to the reference plane RP as viewed in the radial direction with respect to the rotational axis A1 if needed and/or desired. At least one of the first axial surface 36 and the second axial surface 38 can be non-parallel to the reference plane RP in the cross section CS3 if needed and/or desired.

In the cross section CS3, at least one of the first circumferential surface 40 and the second circumferential surface 42 is parallel to the axial direction D2. In the cross section CS3, at least one of the first circumferential surface 40 and the second circumferential surface 42 is parallel to the axial direction D2 in the cross section CS3. In the present embodiment, the first circumferential surface 40 and the second circumferential surface 42 are parallel to the axial direction D2 in the cross section CS3. In the cross section CS3, however, at least one of the first circumferential surface 40 and the second circumferential surface 42 can be non-parallel to the axial direction D2 if needed and/or desired.

In the cross section CS3, the first axial surface 36 includes a first circumferential end 36E and a first additional circumferential end 36F. The first circumferential end 36E and the first additional circumferential end 36F are provided on the cross section CS3. In the cross section CS3, the first additional circumferential end 36F is provided on a downstream side of the first circumferential end 36E in the driving rotational direction D1*l* of the disc brake rotor 10 with respect to the rotational axis A1. In the cross section CS3, the first axial surface 36 extends between the first circumferential end 36E and the first additional circumferential end 36F in the circumferential direction D1.

In the cross section CS3, the second axial surface 38 includes a second circumferential end 38E and a second additional circumferential end 38F. The second circumferential end 38E and the second additional circumferential end 38F are provided on the cross section CS3. In the cross section CS3, the second additional circumferential end 38F is provided on a downstream side of the second circumferential end 38E in the driving rotational direction D11. In the cross section CS3, the second axial surface 38 extends between the second circumferential end 38E and the second additional circumferential end 38F in the circumferential direction D1.

In the cross section CS3, the first circumferential end 36E and the first additional circumferential end 36F are provided in the same position in the axial direction D2. However, the first circumferential end 36E can be offset from the first additional circumferential end 36F in the axial direction D2 if needed and/or desired. In the cross section CS3, the second circumferential end 38E and the second additional circumferential end 38F are provided in the same position in the axial direction D2. However, the second circumferential end 38E can be offset from the second additional circumferential end 38F in the axial direction D2 if needed and/or desired.

In the cross section CS3, the first circumferential surface 40 includes a first axial end 40E and a first additional axial end 40F. The first axial end 40E and the first additional axial end 40F are provided on the cross section CS3. In the cross section CS3, the first axial end 40E is closer to the first axial end part 12C of the hub engagement member 12 than the first additional axial end 40F in the axial direction D2. In the cross section CS3, the first circumferential surface 40 extends between the first axial end 40E and the first additional axial end 40F in the axial direction D2.

In the cross section CS3, the second circumferential surface 42 includes a second axial end 42E and a second additional axial end 42F. The second axial end 42E and the second additional axial end 42F are provided on the cross section CS3. In the cross section CS3, the second axial end 42E is closer to the first axial end part 12C of the hub engagement member 12 than the second additional axial end 42F in the axial direction D2. In the cross section CS3, the second circumferential surface 42 extends between the second axial end 42E and the second additional axial end 42F in the circumferential direction D1.

In the cross section CS3, the first axial end 40E and the first additional axial end 40F are provided in the same position in the axial direction D2. However, the first axial end 40E can be offset from the first additional axial end 40F in the circumferential direction D1 if needed and/or desired. In the cross section CS3, the second axial end 42E and the second additional axial end 42F are provided in the same position in the axial direction D2. However, the second axial end 42E can be offset from the second additional axial end 42F in the circumferential direction D1 if needed and/or desired.

The cross section CS3 includes a first corner part CP31, a second corner part CP32, a third corner part CP33, and a fourth corner part CP34. The first corner part CP31 is provided in a diagonal position of the third corner part CP33. The second corner part CP32 is provided in a diagonal position of the fourth corner part CP34. A first diagonal distance DD31 is defined between the first corner part CP31 and the second corner part CP32. A second diagonal distance DD32 is defined between the second corner part CP32 and the fourth corner part CP34. In the present embodiment, the first diagonal distance DD31 is equal to the second diagonal distance DD32. However, the first diagonal distance DD31 can be different from the second diagonal distance DD32 if needed and/or desired.

For example, the first corner part CP31 is provided between the first axial surface 36 and the first circumferential surface 40 in the cross section CS3. The second corner part CP32 is provided between the first axial surface 36 and the second circumferential surface 42 in the cross section CS3. The third corner part CP33 is provided between the second axial surface 38 and the second circumferential surface 42 in the cross section CS3. The fourth corner part CP34 is provided between the second axial surface 38 and the first circumferential surface 40 in the cross section CS3.

The first corner part CP31 is provided between the first circumferential end 36E of the first axial surface 36 and the first axial end 40E of the first circumferential surface 40 in the cross section CS3. The second corner part CP32 is provided between the first additional circumferential end 36F of the first axial surface 36 and the second axial end 42E of the second circumferential surface 42 in the cross section CS3. The third corner part CP33 is provided between the second additional circumferential end 38F of the second axial surface 38 and the second additional axial end 42F of the second circumferential surface 42 in the cross section CS3. The fourth corner part CP34 is provided between the second circumferential end 38E of the second axial surface 38 and the first additional axial end 40F of the first circumferential surface 40 in the cross section CS3.

At least one of the first corner part CP31, the second corner part CP32, the third corner part CP33, and the fourth corner part CP34 has a round shape. In the present embodiment, each of the first corner part CP31, the second corner part CP32, the third corner part CP33, and the fourth corner part CP34 has a round shape. The cross section has a rounded square shape. However, the shape of the cross section is not limited to the rounded square shape. At least one of the first corner part CP31, the second corner part CP32, the third corner part CP33, and the fourth corner part CP34 can have a shape other than a round shape if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2) B alone, and (3) both A and B. The phrase "at least one of A, B, and C" encompasses (1) A alone, (2) B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake rotor for a human-powered vehicle, comprising:
   a hub engagement member configured to engage with a hub assembly;
   an outer member provided radially outwardly of the hub engagement member with respect to a rotational axis of the disc brake rotor; and
   a coupling arm extending radially outwardly from the hub engagement member to the outer member, the coupling arm including a first axial surface provided on a first axial side in an axial direction with respect to the rotational axis and a second axial surface provided on a second axial side reverse to the first axial side in the axial direction, at least one of the first axial surface and the second axial surface having a cross-sectional profile taken along a circumferential direction being non-parallel to a reference plane as viewed in a radial direction with respect to the rotational axis, the reference plane being perpendicular to the rotational axis.

2. The disc brake rotor according to claim 1, wherein the coupling arm includes a first circumferential surface provided on a first circumferential side in a circumferential direction with respect to the rotational axis and a second circumferential surface provided on a second circumferential side reverse to the first circumferential side in the circumferential direction, and
   at least one of the first circumferential surface and the second circumferential surface is non-parallel to the axial direction.

3. The disc brake rotor according to claim 2, wherein
   the first circumferential surface is non-parallel to the axial direction so as to define a first circumferential angle between the first circumferential surface and the axial direction as viewed in the radial direction,
   the second circumferential surface is non-parallel to the axial direction so as to define a second circumferential angle between the second circumferential surface and the axial direction as viewed in the radial direction, and
   the first circumferential angle is different from the second circumferential angle.

4. The disc brake rotor according to claim 3, wherein
   the first circumferential surface is provided on an upstream side of the second circumferential surface in a driving rotational direction of the disc brake rotor with respect to the rotational axis, and
   the first circumferential angle is larger than the second circumferential angle.

5. The disc brake rotor according to claim 3, wherein
   the first axial surface includes a first circumferential end and a first additional circumferential end provided on a downstream side of the first circumferential end in a driving rotational direction of the disc brake rotor with respect to the rotational axis,
   the first axial surface extends between the first circumferential end and the first additional circumferential end in the circumferential direction,
   the second axial surface includes a second circumferential end and a second additional circumferential end provided on a downstream side of the second circumferential end in the driving rotational direction,
   the second axial surface extends between the second circumferential end and the second additional circumferential end in the circumferential direction,
   the axial direction includes a first axial direction and a second axial direction opposite to the first axial direction,
   the first circumferential end is offset from the first additional circumferential end in the first axial direction, and
   the second circumferential end is offset from the second additional circumferential end in the first axial direction of the disc brake rotor.

6. The disc brake rotor according to claim 1, wherein the coupling arm includes
   a radially inner end,
   a radially outer end provided radially outward of the radially inner end, and
   an intermediate part provided radially between the radially outer end and the radially inner end,
   the intermediate part has a maximum axial width in the coupling arm, the maximum axial width being defined in the axial direction with respect to the rotational axis.

7. The disc brake rotor according to claim 6, wherein the radially outer end is provided on a downstream side of the radially inner end in a driving rotational direction of the disc brake rotor with respect to the rotational axis.

8. The disc brake rotor according to claim 6, wherein the coupling arm has a curved shape from the radially inner end to the radially outer end as viewed in the axial direction.

9. The disc brake rotor according to claim 1, wherein
the coupling arm has a cross section taken along the circumferential direction,
the cross section includes a first corner part, a second corner part, a third corner part, and a fourth corner part,
the first corner part is provided in a diagonal position of the third corner part,
the second corner part is provided in a diagonal position of the fourth corner part,
a first diagonal distance is defined between the first corner part and the third corner part,
a second diagonal distance is defined between the second corner part and the fourth corner part, and
the first diagonal distance is different from the second diagonal distance.

10. The disc brake rotor according to claim 9, wherein at least one of the first corner part, the second corner part, the third corner part, and the fourth corner part has a round shape.

11. The disc brake rotor according to claim 9, wherein the cross section has a rounded square shape.

12. The disc brake rotor according to claim 1, wherein
the first axial surface is non-parallel to the reference plane so as to define a first axial angle between the first axial surface and the reference plane as viewed in the radial direction, and
the second axial surface is non-parallel to the reference plane so as to define a second axial angle between the second axial surface and the reference plane as viewed in the radial direction.

13. The disc brake rotor according to claim 12, wherein the first axial angle is different from the second axial angle.

14. The disc brake rotor according to claim 1, wherein
the hub engagement member includes a first axial end part provided on the first axial side and a second axial end part provided on the second axial side,
the first axial surface is closer to the first axial end part than the second axial surface in the axial direction, and
a first axial distance defined between the first axial surface and the first axial end part in the axial direction is different from a second axial distance defined between the second axial surface and the second axial end part in the axial direction.

15. The disc brake rotor according to claim 14, wherein the second axial distance is longer than the first axial distance.

16. The disc brake rotor according to claim 1, wherein the hub engagement member includes a plurality of internal teeth configured to engage with the hub assembly.

17. The disc brake rotor according to claim 1, wherein
the coupling arm is provided between the hub engagement member and the outer member with a prescribed total number, and
the prescribed total number is at least four.

18. A disc brake rotor for a human-powered vehicle, comprising:
a hub engagement member configured to engage with a hub assembly;
an outer member provided radially outwardly of the hub engagement member with respect to a rotational axis of the disc brake rotor; and
a coupling arm extending radially outwardly from the hub engagement member to the outer member, the coupling arm having a cross section oriented in a radial direction with respect to the rotational axis,
the cross section including a first corner part, a second corner part, a third corner part, and a fourth corner part,
the first corner part being provided in a diagonal position of the third corner part,
the second corner part being provided in a diagonal position of the fourth corner part,
a first diagonal distance being defined between the first corner part and the third corner part,
a second diagonal distance being defined between the second corner part and the fourth corner part, and
the first diagonal distance being different from the second diagonal distance.

19. The disc brake rotor according to claim 18, wherein the coupling arm includes a first axial surface provided on a first axial side in an axial direction with respect to the rotational axis and a second axial surface provided on a second axial side reverse to the first axial side in the axial direction, at least one of the first axial surface and the second axial surface being non-parallel to a reference plane perpendicular to the rotational axis as viewed in the radial direction with respect to the rotational axis.

20. A disc brake rotor for a human-powered vehicle, comprising:
a hub engagement member configured to engage with a hub assembly;
an outer member provided radially outwardly of the hub engagement member with respect to a rotational axis of the disc brake rotor; and
a coupling arm extending radially outwardly from the hub engagement member to the outer member, the coupling arm including
a radially inner end defining an inner axial width in an axial direction with respect to the rotational axis,
a radially outer end provided radially outward of the radially inner end, the radially outer end defining an outer axial width in the axial direction, and
an intermediate part provided radially between the radially outer end and the radially inner end, the intermediate part defining an intermediate axial width in the axial direction, the intermediate axial width being larger than the inner axial width and the outer axial width, wherein
the intermediate axial width is a maximum axial width in the coupling arm, and
the maximum axial width is closer in a radial direction to the hub engagement member than to the radially outer end of the coupling arm.

* * * * *